United States Patent
Prinssen

(10) Patent No.: US 6,622,870 B1
(45) Date of Patent: *Sep. 23, 2003

(54) VACUUM BELT FILTER APPARATUS ENCLOSED IN A PRESSURIZED CHAMBER AND RELATED METHOD OF FILTRATION

(75) Inventor: Alphons Arnoldus Johannes Antonius Prinssen, Den Bosch (NL)

(73) Assignee: Pannevis B.V., Utrecht (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/324,386

(22) Filed: Oct. 17, 1994

Related U.S. Application Data

(63) Continuation of application No. 08/107,279, filed on Aug. 16, 1993, now abandoned.

(30) Foreign Application Priority Data

Sep. 10, 1992 (NL) ............................................. 9201576

(51) Int. Cl.[7] ............................ B01D 33/04; B01D 33/82
(52) U.S. Cl. ....................... 210/398; 210/400; 210/406; 210/783
(58) Field of Search .................. 210/386, 387, 210/398, 400, 401, 406, 783

(56) References Cited

U.S. PATENT DOCUMENTS

| | | | | |
|---|---|---|---|---|
| 2,997,179 A | | 8/1961 | de Gooijer ................. 210/400 |
| 3,899,426 A | * | 8/1975 | Hirs ............................ 210/400 |
| 4,038,193 A | * | 7/1977 | Oosten ........................ 210/400 |
| 4,430,231 A | * | 2/1984 | Bratten ....................... 210/386 |
| 4,568,460 A | * | 2/1986 | Bratten ....................... 210/401 |
| 5,091,079 A | * | 2/1992 | Gayman ..................... 210/400 |
| 5,209,841 A | * | 5/1993 | Bratten ....................... 210/400 |
| 5,308,487 A | * | 5/1994 | Thissen ...................... 210/400 |
| 5,366,626 A | * | 11/1994 | Pierson ....................... 210/398 |
| 5,643,468 A | * | 7/1997 | Ure ............................. 210/398 |

FOREIGN PATENT DOCUMENTS

| | | | | |
|---|---|---|---|---|
| DE | 2947329 | * | 5/1981 | |
| DE | 3306362 | | 9/1983 | ........... B01D/33/04 |
| EP | 0033371 | | 8/1981 | ........... B01D/33/00 |
| EP | 0511710 | * | 11/1992 | |

OTHER PUBLICATIONS

Pannevis Solid Liquid Separation Bulletin, unknown.*

A.A.S.A. Prinssen; Vacuum Belt Filters; Mar./Apr. 1979 Filtration & Separation; pp. 176–180, Feb. 1978.*

A translation of German Patent DE 2,947,329 A1.*

* cited by examiner

Primary Examiner—Robert J. Popovics
(74) Attorney, Agent, or Firm—Webb Ziesenheim Logsdon Orkin & Hanson, P.C.

(57) ABSTRACT

A filtering device for separating liquid and solid material from a mixture consists of an endless filter belt. Filtrate is separated off by means of the pressure difference above and below the filter belt. The device is placed in a high pressure space in order to keep liquid substances which at ambient temperature and atmospheric pressure would become gaseous. The applied pressures can rise to roughly 20 bar.

12 Claims, 1 Drawing Sheet

VACUUM BELT FILTER APPARATUS ENCLOSED IN A PRESSURIZED CHAMBER AND RELATED METHOD OF FILTRATION

This is a continuation applications Ser. No. 08/107,279 filed on Aug. 16, 1993 now abandoned.

BACKGROUND OF THE INVENTION

The invention relates to a filtering device for separating liquid and solid material from a mixture, provided with an endless filter belt, means for supplying the mixture for separating on the upper side of the filter belt and a suction box on the underside of the filter belt connected toga pump.

SUMMARY OF THE INVENTION

Such a filtering device is known from EP-A-92201151.5.

Such a filtering device can only be used for filtering particular mixtures. Mixtures including a substance which at ambient temperature and atmospheric pressure can pass into a gaseous phase cannot be separated with such a filtering device.

It is the object of the invention to provide a filtering device which makes this possible.

This is achieved according to the invention in that the operative components of the filtering device are placed in a pressure chamber, a higher than atmospheric pressure is maintained in the pressure chamber and the difference in the pressure in the chamber and the pressure in the suction box is relatively small.

By placing the mixture for separating under a higher pressure than the lowest evaporation pressure applying to any of the components in the mixture at the prevailing temperature, the danger of any of the substances passing into the gas phase is obviated.

It is noted that a filtering device is known from EP-A-0 033 371 wherein the whole installation is accommodated in a high pressure chamber accessible to service personnel.

Only a limited overpressure can be applied with such an installation. When higher pressures are used the space is no longer accessible to personnel without very special precautionary measures.

BRIEF DESCRIPTION OF THE DRAWING

The invention is further elucidated with reference to the drawings in which.

DESCRIPTION OF THE PREFERRED EMBODIMENT

Figure 1:
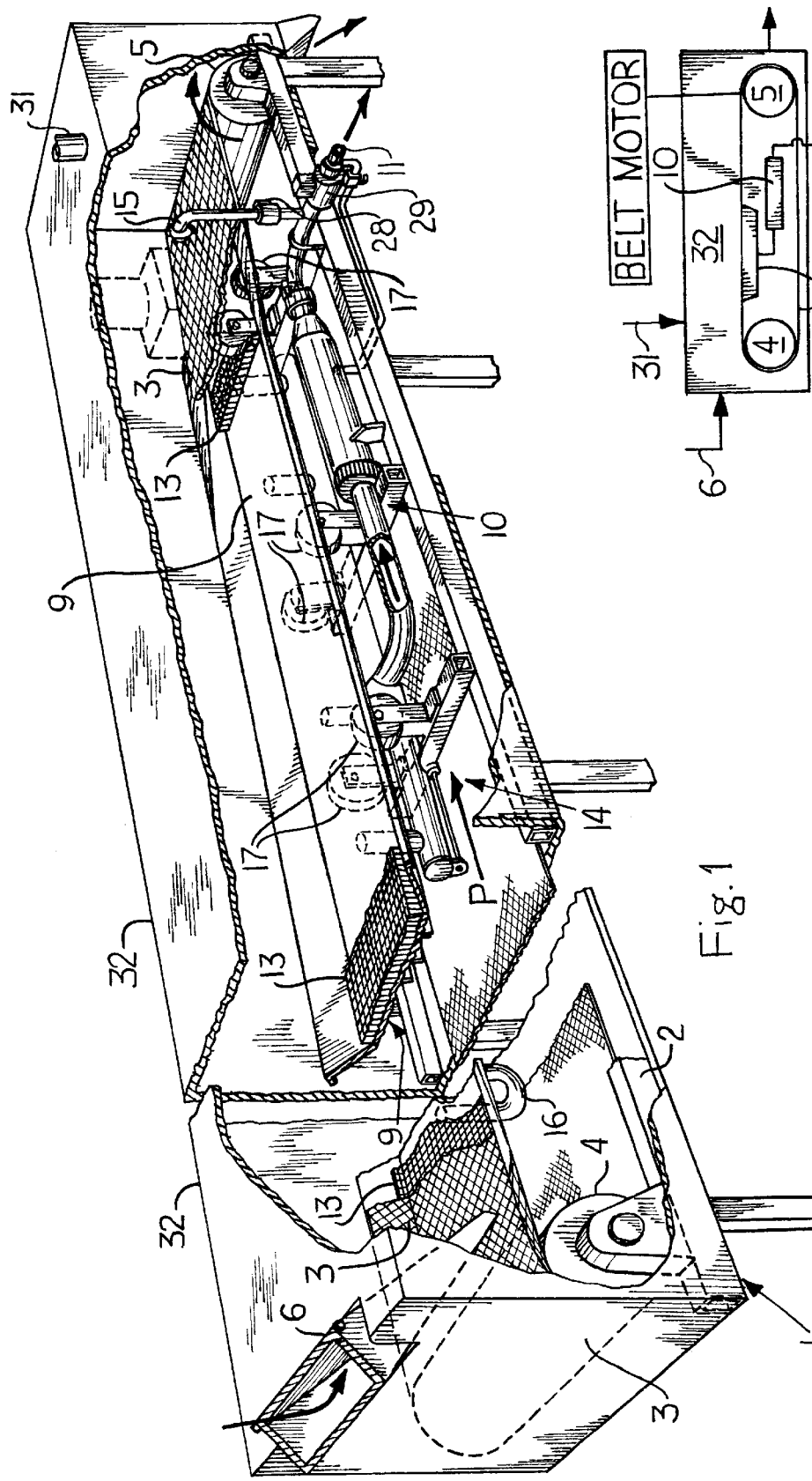
FIG. 1 is a perspective view partially in section of a filtering device according to the present invention.

The device 1 has a frame 2 shown fragmentedly and constructed from vertical and horizontal beams, in which an endless belt 3 is movable over rollers 4 and 5 in the direction of the arrow. The belt is a filter belt that is permeable to liquids. A feed device 6 is placed above the belt for feeding the mixture for separating. Placed under the belt in known manner is a suction box 9 which is connected via a transmission 10 to a vacuum connection 11. The latter, which is provided with a closing valve 29, is connected to a pressure or suction device (not drawn). The suction box 9 has on the top side a grid 13. When a pressure is generated in the suction box the filter belt 3 is held fast on the grid 13, whereby the suction box moves along with the filter belt in the direction of arrow P during the so-called filtration stroke. At the end of the filtration stroke, which is determined by the free space between the length of the box and the distance between rollers 4 and 5, the pressure in the box is increased using the closing valves 28 and 29. The suction box 9 is now retracted by the piston 14 to its original position, whereafter the filtration stroke begins again. The suction box 9 can be built up of different sections, each separately connected to the said pressure or suction devices.

The active part of the filter placed in a chamber 32 and a higher than atmospheric pressure is maintained in the chamber 32, and the difference in the pressure in the chamber 32 and the pressure in the suction box 9 is relatively small. Preferably, the pressure in the pressure chamber 32 amounts to roughly 20 bar, and the pressure in the suction box 9 amounts to roughly 1–2 bar. Connected to chamber 32 are high pressure gas feed conduits 31 for bringing the interior of chamber 32 to, and holding it at, a high pressure solid residue collected on the grid 13 is extracted through shoot 18. Because the drives of the filter belt and the vacuum and air valves are disposed outside the pressure vessel, it is not necessary to take additional steps for these components. The pressure in the chamber can be chosen subject to the substances for treating. In this manner separation of substances which at atmospheric pressure are in the gas phase is made possible.

What is claimed is:

1. A filtering device for separating liquid and solid materials from a mixture, comprising:

a pressure chamber containing an endless filter belt and a suction box;

means for supplying a mixture of liquid and solid materials at higher than atmospheric pressure into said pressure chamber to an upper side of said filter belt;

means for connecting said suction box onto an underside of said filter belt;

at least a drive for said filter belt is located outside of said pressure chamber; and means for maintaining a higher than atmospheric pressure in said pressure chamber and a relatively small difference between the pressure in said pressure chamber and the pressure in said suction box.

2. The filtering device of claim 1 wherein air valves are located outside of said pressure chamber.

3. The filtering device of claim 2 wherein a vacuum control valve is located outside of said pressure chamber.

4. The filtering device of claim 2 further including means for reciprocating said suction box longitudinally within said pressure chamber.

5. The filtering device of claim 1 wherein a vacuum control valve is located outside of said pressure chamber.

6. The filtering device of claim 1 further including means for reciprocating said suction box longitudinally within said pressure chamber.

7. A Filtering device for separating liquid and solid materials from a mixture, comprising:

a pressure chamber containing an endless filter belt and a suction box;

means for supplying a mixture of liquid and solid material to a first side of said filter belt;

means for connecting said suction box to an underside of said filter belt;

at least a drive for said filter belt is located outside of said pressure chamber; and means for maintaining a higher than atmospheric pressure in said pressure chamber of about 20 bar and a relatively small difference of about 1–2 bar between the pressure in said pressure chamber and the pressure in said suction box when said suction box is connected to an underside of said filter belt.

8. The filtering device of claim 7 wherein a vacuum control valve is located outside of said pressure chamber.

9. The filtering device of claim 7 wherein air valves are located outside of said pressure chamber.

10. The filtering device of claim 9 wherein a vacuum control valve is located outside of said pressure chamber.

11. The filtering device of claim 10 further including means for reciprocating said suction box longitudinally within said pressure chamber.

12. The filtering device of claim 7 wherein said means for connecting said suction box on underside of said filter belt includes:

as means for decreasing the pressure in said suction box relative to said pressure in said pressure chamber;

means for allowing said suction box to move with said filter belt within said pressure chamber;

means for increasing the pressure in said suction box to allow said suction box to be decoupled from said filter belt; and means for moving said suction box to its original position within said pressure chamber.

* * * * *

UNITED STATES PATENT AND TRADEMARK OFFICE
CERTIFICATE OF CORRECTION

Figure 2:
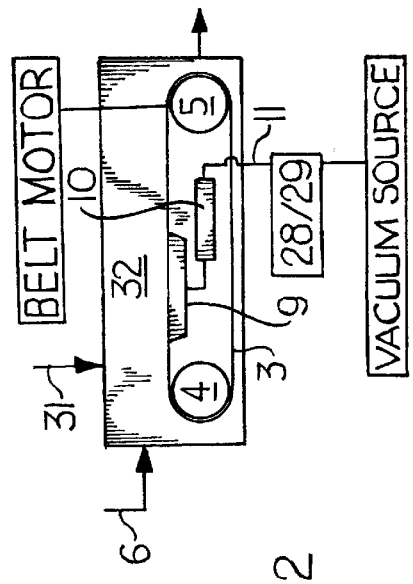
FIG. 2 is a schematic drawing of the filtering device shows in FIG. 1.

PATENT NO. : 6,622,870 B1  
DATED : September 23, 2003  
INVENTOR(S) : Alphons Arnoldus Johannes Antonius Prinssen It is certified that error appears in the above-identified patent and that said Letters Patent is hereby corrected as shown below:

Column 1,  
Line 5, "applications" should read -- application --.  
Line 13, "toga" should read -- to a --.  
Line 15, delete the section heading "SUMMARY OF THE INVENTION".  
Before line 18, insert the section heading "SUMMARY OF THE INVENTION".  
Line 45, "DRAWING" should read -- DRAWINGS --.  
Line 52, "shows" should read -- shown --.  
Line 56, after "device" insert -- , shown in FIGS. 1 and 2 --.

Column 2,  
Line 11, after "filter" insert -- belt is --.

Column 4,  
Line 4, before "means" delete "as".

Signed and Sealed this

Sixth Day of April, 2004

JON W. DUDAS  
*Acting Director of the United States Patent and Trademark Office*